March 21, 1967  J. L. MEYER  3,310,067

FLUID CONDUCTOR AND TAKE-OFF APPARATUS

Filed April 16, 1964  3 Sheets-Sheet 1

INVENTOR.
JOHN L. MEYER
BY Peter J. Murphy
ATTORNEY

United States Patent Office 3,310,067
Patented Mar. 21, 1967

3,310,067
FLUID CONDUCTOR AND TAKE-OFF APPARATUS
John L. Meyer, Robinson Township, Ottawa County, Mich., assignor to Gardner-Denver Company, a corporation of Delaware
Filed Apr. 16, 1964, Ser. No. 360,344
16 Claims. (Cl. 137—580)

This invention relates to a fluid conductor and take-off apparatus of the kind adapted to deliver pressure fluid to fluid operated tools and the like; and, more particularly, the invention relates to an improved pressure fluid conductor which may be tapped continuously by a take-off device moving along the conductor.

An object of this invention is to provide an improved fluid conduit capable of being tapped continuously by a moving take-off device, which may be fabricated in sections of any desired length, and which may be assembled to define a continuous conductor.

Another object of this invention is to provide an improved fluid conduit capable of being tapped continuously by a moving take-off device and which is comprised of individual units of any desired length; the units adapted to be used independently or to be assembled in end-to-end relation to define a continuous conduit system.

A further object of this invention is to provide a fluid conduit system comprising independent conduit sections assembled in end-to-end relation to define an effective continuous conduit capable of being tapped at any point along its length.

A still further object of this invention is to provide a fluid conduit having one flexible wall which is deformable by a cooperating take-off member to tap the conduit at any point along its length, said conduit having end seal means for preventing leakage of air from the conduit when the flexible wall is deformed at the end thereof.

The novel features of the invention, as well as additional objects and advantages thereof, will be understood more fully from the following description when read in connection with the accompanying drawings in which.

Figure 1:
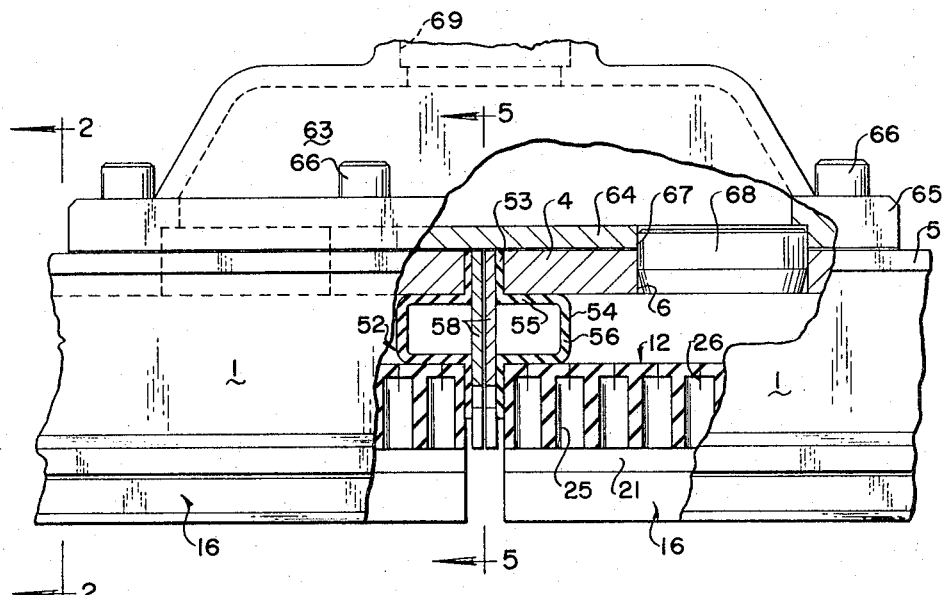
FIG. 1 is a side view, partially in section, of adjacent sections of fluid conduit, according to the present invention, and of a member connecting the sections.

Referring particularly to FIGS. 1 through 5 of the drawings, there is shown a form of fluid conductor or conduit which is adapted for use in fluid conductor and take-off systems of the type shown in U.S. Patents 2,798,506 granted July 9, 1957, and 3,012,574 granted Dec. 12, 1961.

The conduit comprises an elongated, metal, generally C-shaped three sided housing or body 1 having a pair of generally parallel side walls 2 and 3 that are joined together at corresponding edges by a transverse wall 4. The wall 4 defines oppositely projecting ribs 5, which may be engaged by suitable clamps at appropriately spaced intervals for supporting the conduit. The wall 4 is provided with a hole 6 adjacent to each end of the housing, for a purpose to be described. Each of the inner surfaces of the walls 2 and 3 is provided with a laterally projecting, downwardly inclined rib 8, which is longitudinally grooved to form a pocket or recess 9 terminating adjacent the open side of the housing in a lip 10. Each of the walls 2 and 3 is also provided with an external, laterally extending rail 11 for a purpose which will be explained subsequently.

The open side of the C-shaped housing 1 is closed by a deformable wall member 12 formed of a resilient, flexible substance such as rubber or rubberlike material, defining the fourth side of the conduit. The wall 12 is coextensive in length with the housing 1, and has a relatively thick center section 13. From each side of the section 13 extends a relatively thin section 14, terminating at its free edge in an enlargement comprising a generally cylindrical bead 15 and an integral rib 15a. Inasmuch as the sections 14 are thinner than the central section 13, the sections 14 are more flexible than the central section. The overall width of the wall 12 is such as to enable the beads and ribs 15, 15a to be received in the respective grooves 9 with little, if any, distortion of the sections 14.

Retainer strips 16 are provided for removably retaining each of the side edges of the wall 12 in its associated groove 9. Each retainer strip comprises a generally channel-shaped member having a web 18, one side 19 terminating in an enlarged head 20 which seats on the lip 10 of the associated housing wall, and another side 21 engaging a shoulder 22 formed on the adjacent wall 2 or 3. When the retainer strips 16 are locked in place in the positions shown, the beads and ribs 15 and 15a are securely held within the respective recesses 9 of the housing so as to preclude inadvertent separation of the wall 12 from the housing 1. The confronting surfaces of the heads 20 converge toward one another in a direction outwardly of the housing, but are spaced apart from each other to permit engagement of the wall 12 by a take-off device yet to be described.

When the wall 12 is secured to the housing in the manner disclosed, and when the ends of the housing are suitably sealed in a manner to be described, the interior of the housing comprises a closed chamber 23 in which pressure fluid such as air may be maintained under pressure. Except in the region where the wall 12 is engaged by a take-off device, the wall assumes the position indicated in FIGS. 1 and 2 and 5. The pressure of fluid in the chamber 23 tends to force the wall outwardly of the housing so as to maintain the central portion 13 of the wall in snug engagement between and against the heads 20 of the retainer strips 16, and the outer sides of the wall section 13 taper or converge toward one another complementally to the adjacent surfaces of the heads 20 so that the pressure of the fluid in the chamber wedges the wall against the clamping heads 20. The tapering sides of the wall section 13 cooperate with the beads and ribs 15, 15a to prevent displacement of the wall 12 from the housing; and the beads and ribs seal the open side of the housing to prevent the escape of fluid between the member 12 and the housing. Both the outer and inner surfaces of the central part 13 of the wall 12 are flat, as is best shown in FIG. 2.

Extending inwardly from the outer surface of the wall section 13 are a plurality of longitudinally and equally spaced ports or bores 25 that are open externally, but which terminate short of the chamber 23. The section 13 of the deformable wall is provided with a plurality of longitudinally spaced transverse slits 26, each of which extends from the inner surface of the wall section 13 toward the outer surface thereof; and the slits are so located with respect to the bores 25 that each slit communicates with a corresponding bore. Each slit is of such depth as to intersect the adjacent bore, but terminates short of the exposed or outer face of the center section. Each of the slits 26, with its associated bore 25, defines a valved opening from the conduit chamber 23. These valved openings are normally closed, since the wall portions on opposite sides of each slit normally abut each other to seal the slits to prevent the loss of fluid therethrough, and are opened when the central portion 13 of the deformable wall 12 is deflected into the chamber to effect separation of the wall portions on opposite sides of the slits, as best shown in FIG. 6.

Figure 6:
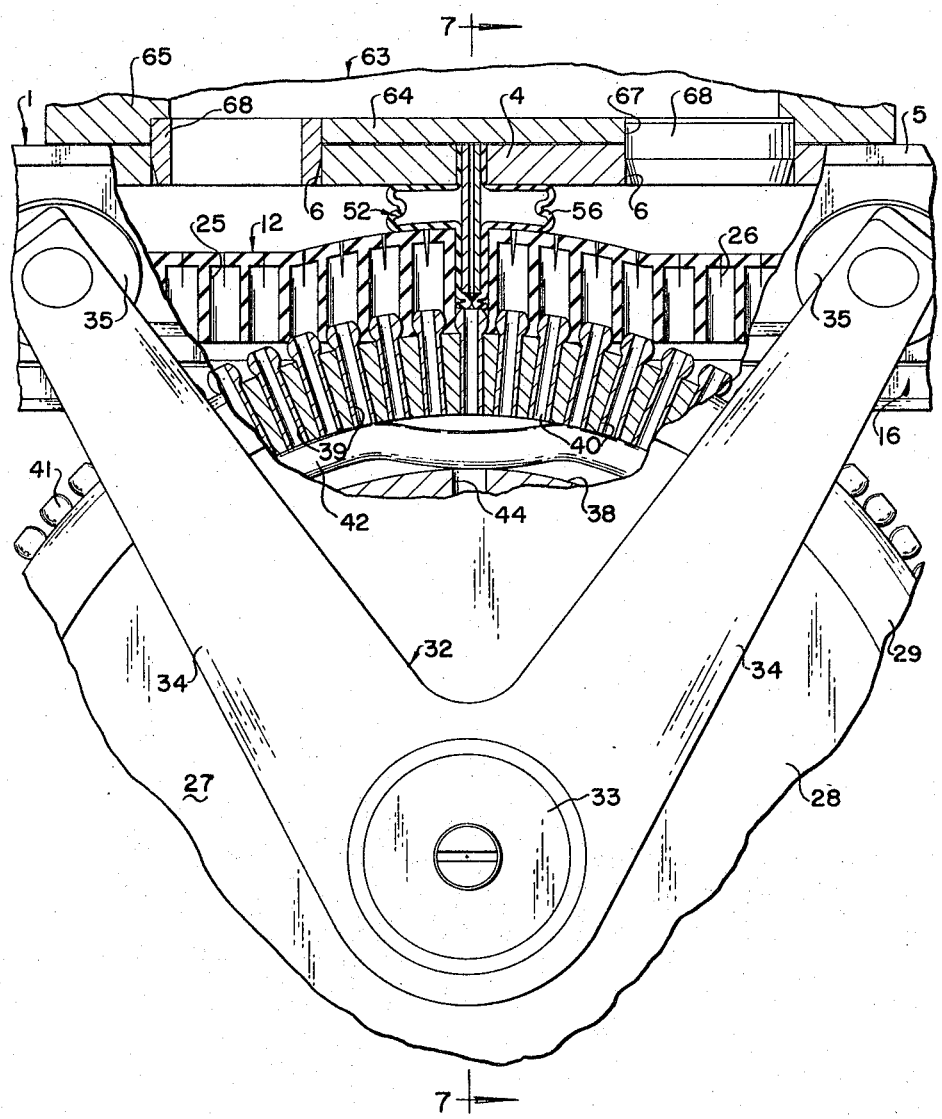
FIG. 6 is a view of adjacent conduit sections similar to FIG. 1, and showing a wheel type take-off device for the conduit.
Figure 7:
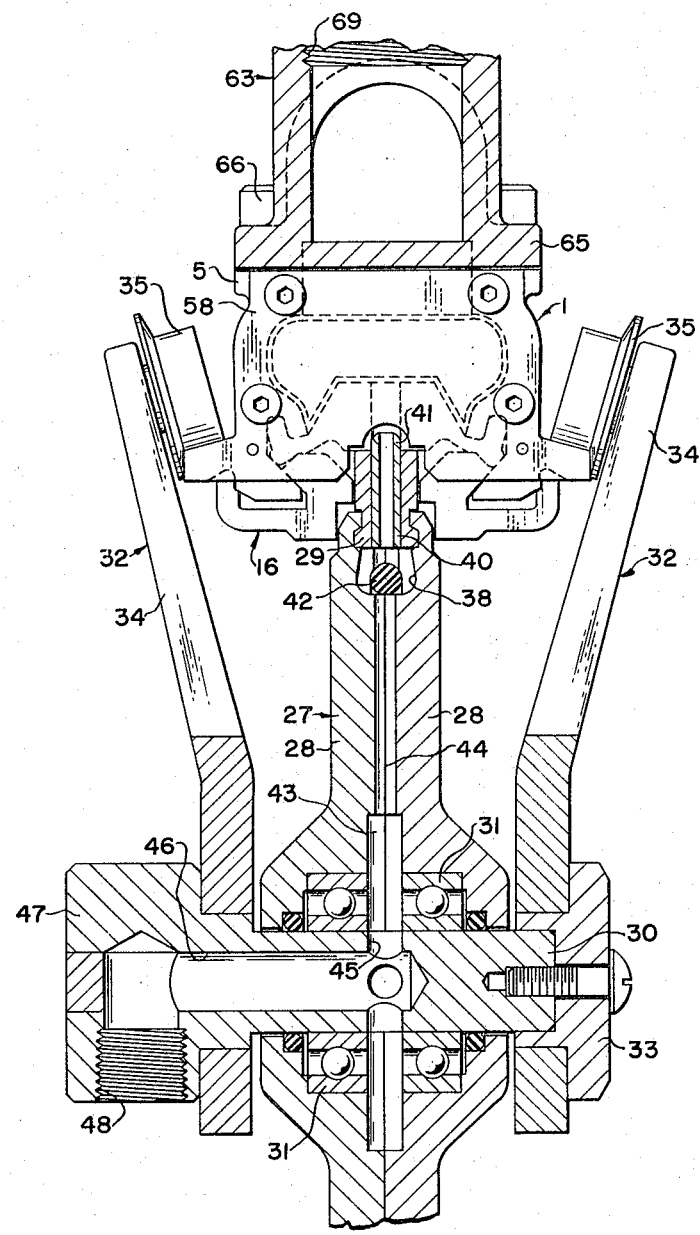
FIG. 7 is a transverse sectional view of the conductor and take-off device as viewed along the line 7—7 of FIG. 6.

In FIGS. 6 and 7 there is shown a fluid take-off apparatus in the form of a wheel 27 which deforms the wall 12, as above described, to open the conduit valves and to receive pressure fluid from the conduit chamber 23. The wheel 27 comprises a pair of complementary discs 28 assembled to support an annular rim 29, the rim being dimensioned to fit between the heads 20 of the retainer strips 16 and having a flat peripheral edge which engages the flat portion of the central wall section 13. The wheel 27 is rotatably mounted on a shaft 30 by means of bearings 31; and the wheel and shaft are mounted in operative association with the conduit housing 1 by means of hanger members 32. Each of the hanger members 32 includes a hub portion which is fixed to the shaft 30, one hanger member being fixed to the shaft by means of an intermediate bushing 33; and each of the members includes a pair of arms 34 which diverge from the hub portion. A flanged wheel 35 is rotatably mounted at the free end of each of the arms 34; and the wheels 35 ride upon the adjacent rail 11 so as to suspend the wheel 27 beneath the deformable wall 12 in condition for movement longitudinally of the housing 1.

The length of the hanger arms 34 are so related to the diameter of the take-off wheel 27 that, in assembled relation, the distance between the flat outer surface of the wall section 13 and the axis of rotation of the wheel 27 is less than the radius of the take-off wheel. Consequently, the peripheral edge of the wheel rim 29 will engage a portion of the wall section 13 and deflect the wall into the chamber 23 along an arc of curvature corresponding to the curvature of the rim 29, the deformation of the wall section 13 being permitted by the flexibility of the material from which the wall sections 13 and 14 are made.

The wheel 27 is provided with an annular chamber 38, defined by the inner surface of the rim 29 and adjacent annular recesses in the discs 28. The annular chamber 38 is communicated with the peripheral surface of the rim by a plurality of radial ports 39 which are angularly spaced about the rim, the spacing at the periphery of the rim corresponding to the spacing between the bores 25 of the deformable wall 12. Fitted in each of the ports 39 is a tubular sleeve 40 terminating at its radially outer end in a substantially spherical bead 41; and each bead 41 has a diameter slightly greater than the diameter of a bore 25, so as to be received in one of the bores 25 in snug engagement with its side walls. A resilient sealing ring 42 is dimensioned to normally lie against the inner wall of the rim 29 and to normally seat against the radially inner ends of the ports 39 to seal these ports.

The annular chamber 38 is communicated with an inner annular chamber 43, in the wheel 27, by means of a plurality of radial passages 44. The annular chamber 43 is open to the shaft 30, and communicates with radial ports 45 in the shaft 30 which open from an axial passage 46. The passage 46 extends to an enlarged head 47 at one end of the shaft 30 which is provided with a radial passage 48, defining an outlet opening for the take-off device. The passage 48 is internally threaded for the purpose of securing a hose fitting therein to connect a pneumatically operated tool to the take-off device, for example.

The region of maximum deformation of the wall 12 by the take-off wheel 27 will be at a point which is tangent to the peripheral edge of the rim 29 at the vertical center line of the latter. From this point in either direction longitudinally of the fluid conductor, the inward deformation of the wall 12 will diminish. In the region of maximum deformation of the wall 12, those portions of the latter adjacent the slits 26 will be spread apart, as shown in FIG. 6, so as to permit the egress of fluid from the housing chamber 23 through the spread apart slits, their communicating bores 25, and the passages in the sleeves 40. The slight oversize of the beads 41 relative to the diameter of the ports 25 prevents any leakage of fluid between the wall 12 and the periphery of the take-off wheel. Fluid thus delivered to the sleeves from the interior of the conduit chamber will displace the sealing ring 42, as is indicated in FIGS. 6 and 7, so as to permit the fluid to enter the chamber 38 whence it may be delivered through the outlet opening 48 via the passages 44, 43, 45 and 46. The presence of fluid in the chamber 38 will act against the sealing ring 42 so as to urge the latter radially outwardly into sealing engagement with all of the ports 39 except those where the ring is displaced radially inwardly, thereby preventing leakage of fluid from the ports 39 which are not in engagement with the wall section 13.

At the opposite ends of the inwardly deformed portion of the wall 12, the inner surface of the wall section 13 is stressed in compression so those portions of the wall on opposite sides of the slits are forcibly squeezed toward one another to seal the slits. As a further safeguard against leakage at opposite ends of the deformed portion of the wall, the beads 41, being slightly larger than the bores 25, will enter and snugly engage the walls of the bores. Should any fluid seep past the slits, it will be received in the sleeves for delivery to the annular chamber 38.

In use, the take-off device 27 may be moved longitudinally of the conduit, either by pulling or pushing the take-off device or by incorporating in the latter a fluid motor of the kind disclosed in Patent No. 3,012,574, for example. In either event, movement of the take-off device along the conduit will result in the deformation of successive portions of the wall 12 inwardly of the housing so as to maintain constant communication between the take-off wheel and the chamber 23. As the take-off wheel traverses the length of the fluid conduit, successive beads 41 on the periphery of the wheel will enter successive bores 25 in the resilient wall, and thereby maintain the associated passages 39 through the annular rim 29 in alignment with the bores in the resilient wall. Moreover, the protruding beads 41 will prevent skidding of the take-off wheel on the conduit wall 12.

Each of the component parts of the above described conduit, namely the housing 1, the deformable wall 12, and the retainer strips 16, may be fabricated in any desired length; therefore, the ultimate length of a section of conduit is limited only by the practical aspects of handling and mounting the conduit in an installation. Regardless of the length of individual sections, it will frequently be desirable to install several lengths of conduit in end-to-end relation to provide the desired length of continuous conduit which may be required for a particular installation. When the pressure fluid in the conduit is tapped, as above described, by a wheel type take-off device which deforms the wall 12, it is necessary to install the adjoining sections of conduit in a relation which will permit the wheel to readily pass from one section to another and which will permit the wheel to tap air from the adjoining sections without interruption and without leakage, even should the wheel be stopped dead center on a joint between adjoining conduit sections. The problem of sealing the ends of the conduit is aggravated by the fact that the deformable wall 12 moves relative to the housing 1; and it has been found that a simple gasket type end seal permits leakage between such seal and the end of the deformable wall 12, when the latter is moved relative to the end seal.

A seal which has been found effective for this application consists of an end seal member 52 formed from a resilient deformable material having a gasket portion 53, dimensioned to lie against the ends of the walls 2, 3, and 4 of the housing and of the deformable wall 12, and having an integral relatively thin walled cup portion 54 dimensioned to be received within the chamber 23 of the conduit. The periphery of the gasket portion is contoured generally according to the outline of the housing 1. The cup portion is defined by side walls 55 which extend transversely from the gasket portion 53 and which are formed to an appropriate size and contour to lie adjacent to the inner surfaces of the conduit walls 2, 3, 4, and 12. At the edges remote from the gasket portion 53, the side walls 55 are closed by an inner wall 56 lying parallel to the gasket portion. The gasket portion 53 is provided with a notch 56 for a purpose to be described.

An end plate 58 is provided for clamping the end seal 52 to the housing 1, the end plate being generally coextensive with the end seal. The plate 58 is secured to the end of the housing by means of suitable screws 59 to compress the gasket portion of the end seal between the housing and the plate. The gasket portion then provides a static seal between the end seal and the housing walls 2, 3, and 4, and also between the end seal and the wall 12. This latter seal may be improved by assembling the wall 12, relative to the housing 1, so that the end of the wall 12 initially protrudes beyond the end of the housing, resulting in some compression of the end portion of the wall 12 when the end seal and end plate are secured to the housing.

In addition to the static seal provided by the gasket portion of the end seal 52, the side walls 55 of the end seal provide a lateral sealing against the conduit walls 2, 3, 4, and 12. When the conduit chamber 23 is pressurized with pressure fluid, the pressure fluid acting on the inner wall 56 of the end seal tends to collapse the cup defined by the walls 55 and 56 to urge the side walls 55 outwardly against the adjacent conduit walls. This seal is maintained when the cup portion 54 is deformed through the deflection of the deformable wall 12, as best shown in FIG. 7.

Figure 2:
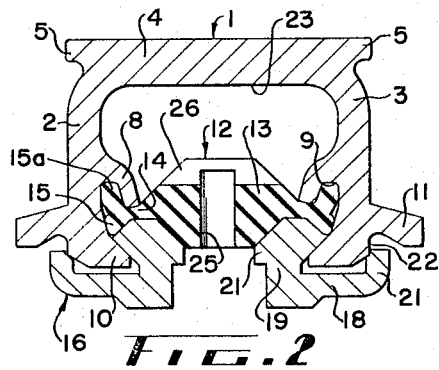
FIG. 2 is a transverse sectional view taken along the line 2—2 of FIG. 1, looking in the direction of the appended arrows.
Figure 3:
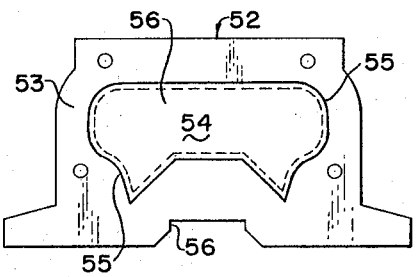
FIGS. 3 and 4 are views of the end sealing member for the conduit of FIG. 1.
Figure 4:
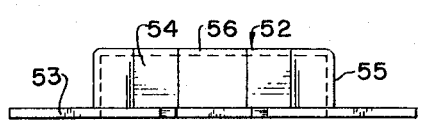

According to the arrangement shown in FIGS. 1, 6 and 7, the adjacent ends of two adjoining conduit sections are longitudinally spaced so that the center to center distance between the bores 25 nearest the adjacent ends of the sections is twice the normal center to center distance between the adjacent bores 25 of the conduit. This spacing is provided by a bridge member 63, which serves the functions of: (a) providing a rigid mechanical joint between the adjoining sections, (b) communicating the chambers 23 of the adjoining sections, and (c) providing means for supplying pressure fluid to the chambers 23. The bridge member 63 comprises a hollow housing having a flat external wall 64 for engagement with the exterior surfaces of the walls 4 of the conduit housings, the wall 64 projecting from the bridge housing to define a peripheral flange 65 having suitable holes for securing the bridge to the conduit housings by means of cap screws 66, for example. The bridge wall 64 is provided with two spaced holes 67 for registry with the holes 6 of the conduit housings; and bushings 68 are fitted into the registering holes 6 and 67 to provide accurate spacing of the conduit sections. For this purpose, the distance between the holes 67 of the bridge and the distance of the holes 6 from the end of the housing 1 are appropriately related. The bridge housing 63 may be provided with an additional tapped hole 69, for connection to a pressure fluid supply line to supply fluid to the conduit sections. Alternatively, the tapped hole 69 may be plugged wherein the bridge provides communication between the chambers 23 of adjoining conduit sections.

Figure 5:
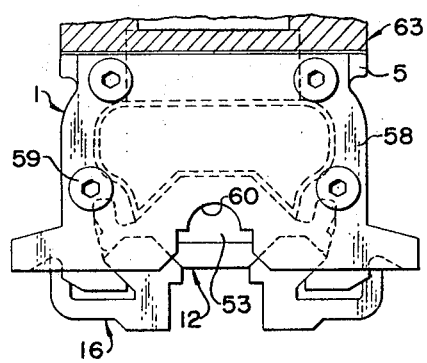
FIG. 5 is a transverse view of the conduit and connecting member of FIG. 1, as viewed along the line 5—5 thereof, presenting an end view of a conduit section.

The conduit sections are so spaced that the space between the adjacent ends of the walls 12 is equivalent to the diameter of a bore 25, and will accommodate one of the beads 41 of the take-off wheel 27. While the space between the conduit walls 12 will accommodate the bead 41, the space between the end plates 58 will not; therefore, the end plates are provided with notches 60, as best shown in FIGS. 5 and 7, for accommodating the wheel rim 29 and a bead 41 as the wheel passes over a conduit joint.

With the provision of a space equivalent to one bore 25 between the adjoining conduit sections, a problem is created by the fact that a number of wheel ports 39 are unsealed simultaneously by the sealing ring 42, as best shown in FIG. 6. Referring to FIG. 6, it will be seen that the opening from the bead 41, which lies between the adjoining sections of conduit, represents a flow path to the ambient atmosphere from the chamber 38 and from the adjacent ports 39, unless some means is provided for sealing this port opening. This means is provided by the adjacent portions of the end seals 52 which are exposed by the notches 60 of the adjacent end plates. The notch 56 of the end seal is not as deep as the notch 60 in the end plate; therefore, the gasket portion 53 is exposed at the notch 60, as best shown in FIG. 5. Since the space between the adjacent ends of the walls 12 is provided to just accommodate a wheel bead 41, the inner edges of the gasket notches 56 will be engaged by the bead 41 as it enters this space. As the wheel 27 progresses further toward the joint, the walls 12 are deflected inwardly of the housing, the end seals 52 are deformed and/or distorted, and the portion of the end seals within the end plate notches 60 are additionally distorted to effectively seal the opening from the bead 41 and prevent escape of pressure fluid therefrom.

What has been described is a fluid conduit system of indefinite length, for use with a fluid take-off wheel which travels along the conduit. The conduit system comprises independent sections of conduit; each section having one deformable wall provided with longitudinally spaced, normally closed ports which are opened when the wall is deformed by the passing of the take-off wheel. End seals are provided for each section, so that any one section may be employed in an independent system, or so that multiple sections of conduit may be joined end to end to provide a system of any desired length. The end seals are particularly adapted to prevent leakage from the conduit when the take-off wheel deforms the ends of the deformable walls while passing from one conduit section to another.

The rim of the take-off wheel is provided with equally spaced ported projections which are spaced to correspond with the ports of the conduit; and bridge members are provided for joining the sections of conduit in a manner to maintain registry of the conduit ports and of the take-off wheel ports. Means are also provided for preventing escape of fluid from a wheel port, for which there is no registering conduit port at a joint between conduit sections.

What is claimed is:
1. In a fluid conductor and take-off assembly;
an elongated fluid conductor comprising a rigid housing generally defining three walls of the conductor chamber and a resilient member joined along its edges to said housing to close said chamber and defining a deformable wall; said deformable wall having a plurality of longitudinally spaced, normally closed openings therein in communication with said chamber, adapted to be opened upon deformation of said wall inwardly of said chamber;
fluid take-off means having an arcuate surface provided with a number of spaced apart ported projections, the spacing between adjacent projections of said take-off member corresponding substantially to the spacing between adjacent openings in said wall; means mounting said take-off means for movement longitudinally of said housing with said arcuate surface in engagement with said deformable wall to deform said wall inwardly of said chamber in the region of said engagement, said projections registering with said normally closed openings in said wall;

end seals for said conductor each comprising a cuplike member formed of resilient deformable material, and having relatively thin walls dimensioned to be received within the conductor chamber in close relation to the inner walls thereof;

and means for securing said end seals to said conductor housing in a manner to permit deformation of said seals with said deformable wall when the ends of said wall are engaged by said take-off means, to maintain the seal between the end seals and the walls of the chamber.

2. A fluid conductor and take-off system comprising:

a plurality of independent sections of conduit, each tappable at spaced points along its length; means for coupling said conduit sections in adjoining, end-to-end relation to define an effective continuous conduit; and a take-off device mounted for movement along said continuous conduit and for taking fluid from said conduit sections during such movement;

each conduit section comprising an elongated rigid housing having an open side and a strip of resilient, deformable material joined along its edges to said housing to close the open side thereof, thereby defining a hollow chamber having one deformable wall; said deformable wall having a pluraliy of longitudinally and equally spaced, normally closed openings therein in communication with said chamber, adapted to be opened upon deformation of said wall inwardly of said chamber; an end seal for each end of said conduit section comprising a member formed of resilient deformable material, defining a relatively thin walled cup dimensioned to be closely received within the conduit chamber; means for securing said end seals to said conduit housing;

said coupling means comprising a bridge member attachable to the ends of adjacent conduit sections for securing said sections together;

said take-off device comprising a member having an arcuate surface for engagement with said deformable wall; means mounting said take-off device for movement along said housing in predetermined spaced relation thereto with said arcuate surface in engagement with said wall to deform said wall inwardly of said conduit chamber in the region of said engagement; and said take-off device having fluid passages opening to said arcuate surface and communicating with said openings in said deformable wall.

3. The fluid conductor and take-off system set forth in claim 2 wherein said take-off device includes a wheel defining said arcuate surface.

4. The fluid conductor and take-off system set forth in claim 3 wherein said openings in said deformable wall include longitudinally spaced bores opening from the outer surface thereof; wherein said arcuate surface of said take-off wheel is provided with a number of spaced apart ported projections, the spacing between adjacent projections corresponding substantially to the spacing between adjacent bores in said wall; said projections registering with said bores; and said bridge members defining means for longitudinally spacing adjoining conduit sections to maintain the registry of the wall bores of the adjoining sections with the projections of said take-off wheel.

5. The fluid conductor and take-off system set forth in claim 2 wherein said housings are provided with a supply port adjacent to each end thereof, in one wall thereof; wherein said bridge member comprises a hollow housing having spaced ports in one wall thereof; said bridge member being mountable on the housings of adjoining conduit sections with each of the ports in said bridge being in registry with an associated conduit port, for communicating the chambers of the adjoining conduit sections.

6. The fluid conductor and take-off system set forth in claim 5 including a bushing snugly received in each of said bridge ports and in the registering port of a conduit housing, whereby said bridge member defines the longitudinal spacing between adjoining conduit sections.

7. The fluid conductor and take-off system set forth in claim 5 wherein said bridge is provided with a tapped opening for connection to a fluid supply line, for the purpose of supplying pressure fluid to said conduit sections.

8. A fluid conductor and take-off system set forth in claim 2 wherein said end seals each include a flange integral with the lip of said cup; and wherein the means for securing an end seal includes an end plate for securing said flange to said conductor housing.

9. The fluid conductor and take-off system set forth in claim 8 wherein said end seal members are deformable with the associated end of a deformable wall, and wherein both said end seal member and said deformable wall are movable relative to said end plate when said take-off device moves from one conduit section to another.

10. The fluid conductor and take-off system set forth in claim 8 wherein said adjoining conduit sections are disposed in nearly abutting relation by said bridge member; wherein said end plates are notched in the area of the outer surface of said deformable wall to permit the movement of said take-off device from one section to another; and wherein said flanges of said end seal members are exposed at the notches in said end plates; said exposed flanges of the adjacent seal members being engaged by the said take-off device as it moves from one conduit section to another to seal a fluid passage opening from said take-off device which is in registry with the space between the adjoining sections of the deformable wall.

11. A fluid conductor tappable at spaced points along its length comprising:

an elongated rigid housing generally defining three walls of the conductor chamber; an elongated resilient member joined along its edges to said housing and defining a deformable wall; said deformable wall having openings therein which are normally sealed, and which are opened to release pressure fluid from said chamber when said deformable wall is deflected into said chamber by a fluid take-off member;

end seals for said conductor each comprising a cuplike member formed of resilient deformable material, extending into the end of the conductor; the side walls of said cup member being relatively thin and the side walls being formed for a close fit with the inner surfaces of the chamber walls to provide lateral sealing against said walls when said seal is subject to conductor pressure; and means for securing said end seals to said conductor housing; said end seals being deformed when said deformable wall is deflected into said chamber at the end thereof to maintain the seal between the end seal and the walls of the chamber.

12. The conductor set forth in claim 11 wherein said means for securing said end seals comprise end plates overlying said housing and said deformable wall, said end plates being clamped to the ends of said housing; and said end seals being disposed for movement with said deformable wall relative to said end plates, when the ends of said deformable wall are deformed into said chamber.

13. The conductor set forth in claim 11 wherein said housing is uniform in cross section throughout its length; wherein said resilient wall member is uniform in cross section throughout its length and wherein said wall openings are repetitive at uniform intervals along its length; and said housing, said resilient wall member, and said end seals thereby adapted to be assembled to define unitary conductor sections of selected lengths.

14. The conductor set forth in claim 11 wherein each cuplike end seal includes a flange portion integral with the lip of the cup portion for engaging the end surface of the conductor; and including an end plate for securing said end seal to said conductor housing.

15. The conductor set forth in claim 14 wherein said flange portion extends radially in all directions from the cup portion to, and is adapted to, be urged in sealing relation with the end surfaces of the housing and of the deformable wall.

16. The conductor set forth in claim 14 wherein said securing means for said flange portion comprises means for clamping said portion in sealing relation to the end surface of said rigid housing only.

References Cited by the Examiner

UNITED STATES PATENTS

| | | | |
|---|---|---|---|
| 2,321,667 | 6/1943 | Foster | 220—24 |
| 3,012,574 | 12/1961 | Baker | 137—580 |
| 3,200,984 | 8/1965 | Fueslein | 138—89 |

M. CARY NELSON, *Primary Examiner.*

W. R. CLINE, *Assistant Examiner.*